Sept. 16, 1969  A. E. REVELL  3,467,797

SWITCH ARRANGEMENT FOR ROLL-TYPE FILTERS

Filed Feb. 27, 1968

INVENTOR.
ALAN E. REVELL

BY

Ralph C. Brick
ATTORNEY

# United States Patent Office 3,467,797
Patented Sept. 16, 1969

3,467,797
SWITCH ARRANGEMENT FOR ROLL-
TYPE FILTERS
Alan E. Revell, Louisville, Ky., assignor to American Air
Filter Company, Inc., Louisville, Ky., a corporation of
Delaware
Filed Feb. 27, 1968, Ser. No. 709,595
Int. Cl. B65h 25/14
U.S. Cl. 200—61.16                    5 Claims

ABSTRACT OF THE DISCLOSURE

An improved switch arrangement in a roll-type filter assembly wherein a filter medium advance "on-off" control switch in the filter assembly is actuated by a filter medium supply roll sensing run-out arm, pull cable, and switch actuating arm arrangement, the switch actuating arm being biased toward the "on-off" control switch.

BACKGROUND OF THE INVENTION

The present invention relates to fluid filters and finds particular utility in the gas separation art where roll-type filter assemblies are applied which move filter medium from a filter medium supply section through a gas treating section to a filter medium take-up section.

Various type filter arrangements are known in the art which advance filter medium from a roll in a supply section through a gas treating section to a take-up roll in a rewind section. In these filter arrangements, a number of devices have been utilized to sense the amount of filter medium in the supply zone and to accordingly control a suitable filter medium supply signal and a power-operated means which serves to move the filter medium from a roll in the supply section through a fluid treating section to the take-up section. For the most part, these past devices have been comparatively expensive and complex in construction, installation, and maintenance, have been restrictive in their use, requiring readjustments and realignments when the filter housing in which they have been installed are changed in position, and have presented problems in field adjustment.

SUMMARY OF THE PRESENT INVENTION

In accordance with the present invention, many of the problems of the past are eliminated by a new, useful, and unobvious filter medium sensing and medium feed control device which is straightforward and economical in construction, operation, and maintenance, utilizing a minimum of materials and operating parts, and requiring a minimum of time for field assembly and installation. Further, the novel device of the present invention facilitates shipping of an over-all filter unit in several readily assemblable modular sections and permits mounting of the assembled filter housing in any one of several positions without necessitating major modifications. In addition, the appparatus of the present invention permits ready accessibility for minor mechanical adjustable settings at either end of the filter housing, the settings requiring a minimum of steps and parts.

Various other features of the present invention will become obvious to one skilled in the art upon reading the disclosure set forth herein.

More particularly, the present invention provides a filter assembly comprising: a filter housing including a filter medium supply section, a fluid treating section, and a filter medium take-up section; a supply of filter medium supported in roll form upon a mandrel in the supply section; power operated means to move the filter medium from the roll in the supply section through the fluid treating section to the take-up section; an "on-off" control switch connected to the power-operaed means; a run-out arm pivotally mounted to movably engage against the filter medium in the supply section; a switch actuating arm pivotally mounted to movably engage the "on-off" control switch; cable means connecting the run-out arm and the switch actuating arm; and spring means cooperating with the connected run-out arm and switch actuating arm to urge the run-out arm into firm engagement against the supply roll and to bias the switch actuating arm toward the control switch, whereby the control switch is actuated to "off" position upon preselected reduction of filter medium upon the supply roll.

It is to be understood that various changes can be made in the arrangement, form, and construction of the apparatus disclosed herein without departing from the scope or spirit of the present invention.

Referring to the drawing which discloses one advantageous embodiment of the present invention:

Figure 1:
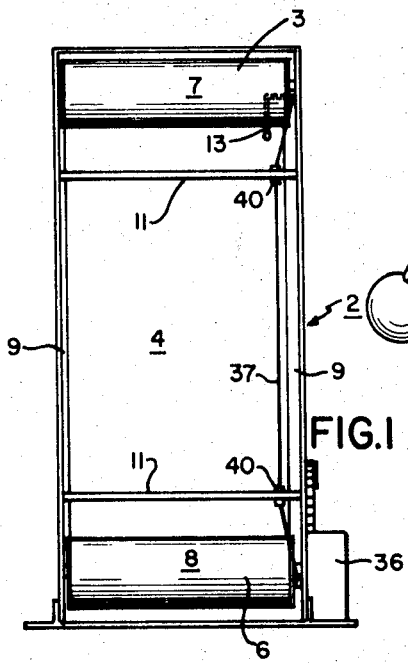
FIGURE 1 is a front end view of a roll-type filter assembly incorporating the novel features of the present invention.

Referring to FIGURE 1 of the drawing, a roll-type filter housing 2 is disclosed, this housing including roll support supply section 3, gas treating section 4, and roll support rewind section 6. Supply section 3 serves to receive and support a roll of filter medium material 7. Roll 7 can be comprised of a web of suitable filter medium material such as fiber glass. Advantageously, it can be in compressed condition on roll 7 in supply section 3 to be expanded from the roll in gas treating section 4 and compressed again as a take-up roll 8 in rewind section 6. The web is progressively advanced through section 4 which includes spaced opposed edge seals 9 which frame a fluid stream passage through which fluid to be treated must flow. Suitably spaced structural brace bars 11 extend transverse housing 2 intermediate edge seal 9.

Figure 4:
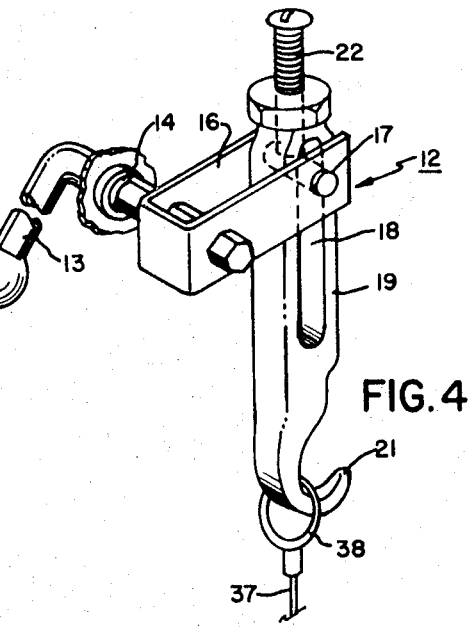
FIGURE 4 is an enlarged isometric view of the novel filter medium sensing run-out arm assembly and adjustable setting device.

Referring to FIGURE 4 of the drawing, details of the filter medium supply roll run-out arm assembly 12 are disclosed. Run-out arm assembly 12 includes a right-angle sensing lever 13 having one leg pivotally mounted to housing 2 at 14, and being sized and positioned so that the free end of the other leg thereof bears against the roll of filter medium 7. The pivoted leg of sensing lever 13 is of hexagonal cross section and snugly passes through a set of hexagonally shaped apertures in the side walls of U-shaped bracket member 16 so that such bracket member 16 pivots with sensing arm 13. Pin 17 is positioned in supported relation between the side walls of bracket 16, the pin passing through longitudinally extending slot 18 in yoke 19. One end of yoke 19 is hooked shaped as at 21 to support the support ring of a cable end described hereinafter. The other end of yoke 19 has screw 22 threaded therein, the shank end of screw 22 abutting against pin 17 to permit adjustable positioning of yoke 19 relative bracket 16.

Figure 2:
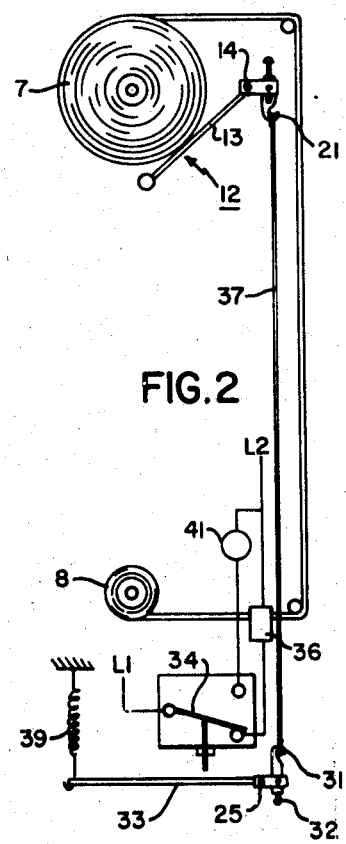
FIGURE 2 is an enlarged schematic side view of the apparatus of FIGURE 1 disclosing details of the filter medium sensing and filter medium control device with a substantially full roll of filter medium in the supply section.
Figure 3:
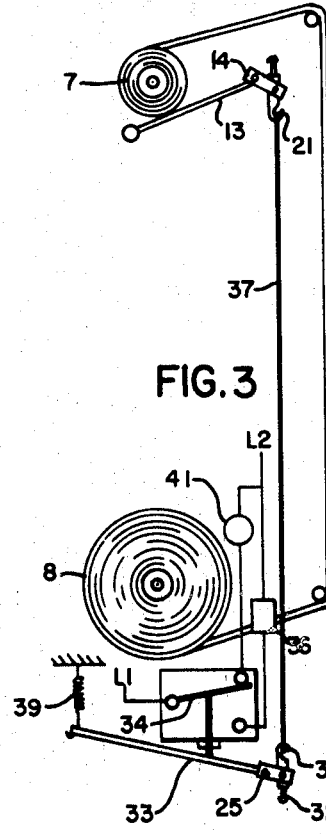
FIGURE 3 is an enlarged view similar to FIGURE 2, with a reduced roll of filter medium in the supply section.
Figure 5:
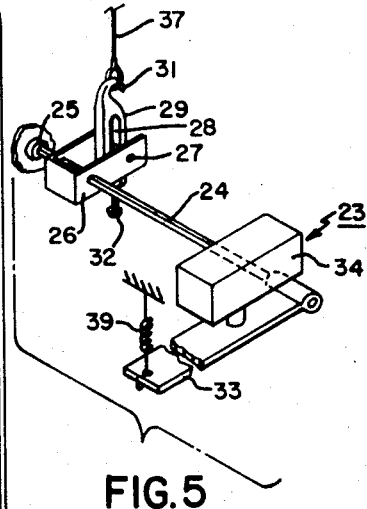
FIGURE 5 is an exploded isometric partially schematic view of the novel filter medium switch actuating arm assembly and adjustable setting device.

Referring to FIGURE 5 of the drawing, details of the switch actuating arm assembly 23 is disclosed. Switch actuating arm assembly 23 advantageously can be positioned adjacent take-up section 6 and includes bar member 24 pivotally mounted at pivot 25 to housing 2 at a suitably selected position adjacent take-up roll 8. Bar 24 is of hexagonal cross section and snugly passes through a set of hexagonal spaced apertures in the opposed spaced side walls of U-shaped bracket 26 so that such bracket pivots with bar 24. Pin 27 extends in supported relation between the side walls of bracket 26 to pass through longitudinally extending slot 28 in yoke 29. One end of yoke 29 is hook shaped as at 31 to receive the support ring at the other end of the cable described hereinafter. The other end of yoke 29 has screw 32 threaded therein, the shank end of screw 32 abutting against pin 27 to permit adjustable positioning of yoke 29 relative bracket 26. The free end of pivotally mounted bar 24 passes in snug engagement through a hexagonal shaped aperture in lever arm 33. Lever arm 33 is positioned to engage the switch button of "on-off" control switch 34, switch 34 being advantageously positioned within the housing of the power assembly disclosed schematically at 36. As can be seen in FIGURES 2 and 3 of the drawings, a suitable cable 37, advantageously of steel strand and having support rings 38 fastened at the ends thereof is provided to extend in supported position between hook 21 of the run-out arm assembly 12 and hook 31 of the switch actuating arm assembly 23 to link the assemblies together. It is to be noted that since the cable is flexible, it can be passed through Mylar or other low friction guide grommets mounted at the end of brace bars 11. A spring 39 positioned in the take-up section is adapted to engage lever arm 33 to bias such lever arm toward the switch button. At the same time, spring 39 serves to bias arm 13 or run-out assembly 12 toward supply roll 7. Thus, with this aforedescribed arrangement, it readily can be seen that the run-out arm sensing device can be utilized with a filter housing oriented in any one of several positions without concern as to the pull of gravity or misalignment. It also can be seen that by virtue of the aforedescribed structural arrangement, the filter housing can be shipped as separate modular sections and that the support rings 38 of cable 37 can be readily mounted to hooks 21 and 31 in the field and the setting of the actuating arms adjusted.

As can be seen in FIGURES 2 and 3 of the drawing, as the filter medium from roll 7 in the supply section reaches a preselected exhausted position, the switch actuating arm 33 urges the button on the "on-off" control switch 34 to the "off" position. Accordingly, the power assembly 36 extending across the power line $L_1$-$L_2$ is placed in the "off" position and a parallel indicating light 41 is flashed on to indicate that a new roll of filter medium is required.

The invention claimed is:
1. A filter assembly comprising: a filter housing including a filter medium supply section, a fluid treating section, and a filter medium take-up section; a supply of filter medium supported in roll form upon a mandrel in said supply section; power operated means connected to said housing for moving said filter medium from said roll in said supply section through said fluid treating section to said take-up section; an "on-off" control switch connected to said power operated means; a run-out arm pivotally mounted to movably engage against said filter medium in said supply section; a switch actuating arm pivotally mounted to movably engage against said "on-off" control switch; cable means connecting said run-out arm and said switch actuating arm; and spring means cooperating with said run-out arm and said switch actuating arm urging said run-out arm into firm engagement against said supply roll and biasing said switch actuating arm with reference to said "on-off" control switch whereby said "on-off" control switch is actuated to "off" position upon preselected reduction of filter medium upon said supply roll.

2. The apparatus of claim 1, said power operated means and said switch actuating arm being positioned as an integral unit adjacent said take-up supply roll, said cable means extending alongside said filter housing from said run-out arm to said switch actuating arm.

3. The apparatus of claim 1, said run-out arm and said switch actuating arm each having its pivot point intermediate its respective ends with one end of said run-out arm engaging against said supply roll, an end of said switch actuating arm engaging said "on-off" control switch, and the free ends of said respective arms connected by said cable means, said spring means comprising a spring member fixed at one end and having its opposite end engaging said switch actuating arm biasing said arm toward said "on-off" control switch.

4. The apparatus of claim 1, and adjusting means positioned at at least one end of said cable means to permit setting adjustment of the cable position between said run-out arm and said switch actuating arm.

5. The apparatus of claim 4, said adjusting means including a U-shaped bracket member having opposed side walls fixed to one of said pivoted arms, a pin supported between said side walls; a cable yoke having a longitudinally extending slot through which said pin extends, one end of said yoke having a hook member receiving said cable and the other end having a screw member threaded therein and abutting against said pin to permit the positional adjustment of said yoke relative said pin.

References Cited
UNITED STATES PATENTS

| | | | |
|---|---|---|---|
| 1,300,257 | 4/1919 | Felland | 200—61.16 |
| 1,542,808 | 6/1925 | Adams | 200—61.16 |
| 2,081,015 | 5/1937 | Mullen et al. | 200—61.16 |
| 2,722,993 | 11/1955 | Gerber et al. | 55—354 |
| 2,848,064 | 8/1958 | Gregory et al. | 55—352 |

H. O. JONES, Primary Examiner

U.S. Cl. X.R.

55—354